Dec. 29, 1953

G. E. CANHAM 2,664,038

APPARATUS FOR TYPE COMPOSITION

Filed Sept. 25, 1951

INVENTOR
George E. Canham
BY
*Ramsey, Chisholm & Hilder*
ATTORNEYS

Dec. 29, 1953     G. E. CANHAM     2,664,038
APPARATUS FOR TYPE COMPOSITION

Filed Sept. 25, 1951     3 Sheets-Sheet 2

INVENTOR
George E. Canham
BY
Ramsey, Chisholm & Hilder
ATTORNEYS

Dec. 29, 1953     G. E. CANHAM     2,664,038
APPARATUS FOR TYPE COMPOSITION

Filed Sept. 25, 1951     3 Sheets-Sheet 3

| SWITCH | PERIOD OF CONTACT (MINUTES) |
|---|---|
| MAIN | :00 ———————————————— 1:30 |
| FLOOD LIGHT | :01—:03 |
| TRIGGER | :02—:04 |
| WINDING MOTOR | :04 ———————— :20 (MAX.) |
| BELL | 1:29 |

INVENTOR
George E. Canham
BY
Ramsey, Chisholm + Fields
ATTORNEYS

Patented Dec. 29, 1953

2,664,038

UNITED STATES PATENT OFFICE 2,664,038

APPARATUS FOR TYPE COMPOSITION

George E. Canham, West Orange, N. J., assignor to Ralph C. Coxhead Corporation, Newark, N. J., a corporation of Delaware Application September 25, 1951, Serial No. 248,145

3 Claims. (Cl. 95—14)

This invention relates to automatic camera apparatus in which the picture is developed within the camera immediately after exposure so as to produce a positive print without delay, and in which the camera is operated automatically to illuminate the object to be photographed, take the picture, and progress the film to initiate development of the picture.

In the production of typed copy for photolithographic printing processes, the copy is first typed in column form, the individual lines preferably being justified to improve their appearance and legiblity. One specialized composing machine for doing this is shown in Norton U. S. Patent 2,465,657. While typewriters or composing machines such as shown in Patent 2,456,657 are provided with interchangeable type fonts of different sizes, such a machine is not adapted for typing in a size large enough for use as a headline. A usual way to set headlines is to paste together individual letters of the selected size to form the desired words.

The present invention is directed to an automatic camera whereby a headline may be typed on a typewriter or composing machine such as shown in Patent 2,465,657 and the typed material inserted in the camera, after which it will automatically illuminate the type material, take an enlarged picture, progress the film to initiate development of the picture, and then automatically shut off; thus producing with a period as short as a minute-and-a-half a positive reproduction of the typed headline enlarged to the degree desired. The enlarged positive reproduction of the typed material may then be pasted on the makeup sheet to supply the required headline. The camera apparatus of the present invention may also be used for the rapid reproduction of documents and letters.

In the form shown of the present invention, a camera of the Polaroid Land type is utilized, in which the film is developed and a picture printed within the camera, developing being initiated by progressing the film and printing paper so as to crush a pod containing the developing and printing fluid. Such a camera will produce a positive of the picture in one minute after developing is initiated. According to the present invention, the object to be photographed; i. e., the typed headline, is placed within a light-tight enclosure and the machine actuated. The machine then proceeds automatically to illuminate the typed headline, operate the camera shutter to expose the picture, progress the film and printing paper to initiate development and printing of the picture, stop the film progression at the proper point, and then indicate when sufficient time has elapsed for development and printing of the picture, after which the picture may be withdrawn from the machine.

An object of the present invention is to provide automatically operating camera apparatus of the type in which the picture is developed and printed within the camera having automatic mechanism for progressing film to initiate development and for stopping operation of the film-progressing mechanism when the film has been progressed the proper amount.

Another object of the invention is to provide an improved automatic mechanism for completely automatically operating a camera of the Polaroid Land type.

Still another object of the invention is to provide an improved machine for producing headlines used with typed copy in photolithographic printing.

Further objects and objects relating to details and economies of manufacture and use will more definitely appear from the detailed description to follow:

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
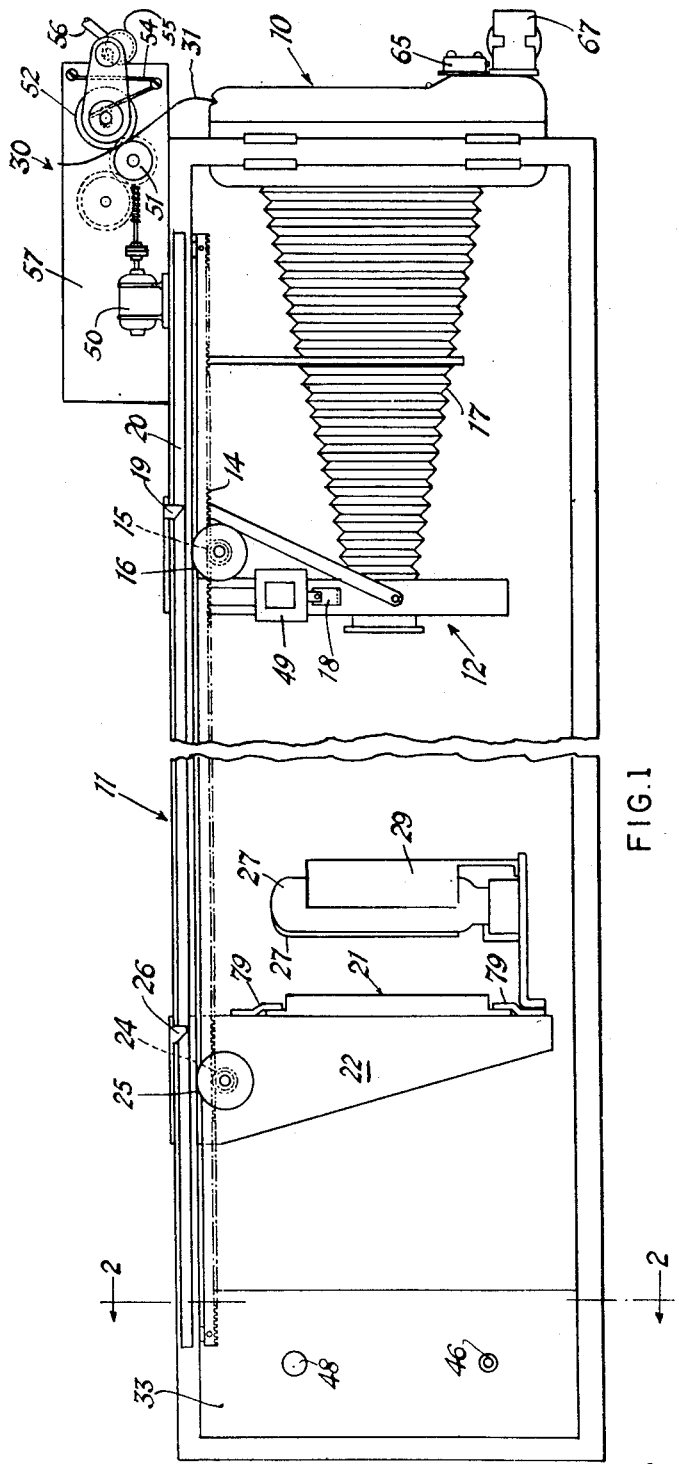
Fig. 1 is a somewhat diagrammatic side elevation of the machine of the present invention, portions of the machine being broken away or omitted for clarity and convenience of illustration.

The machine of the present invention comprises a camera generally indicated as 10, which is mounted in one end of a light-tight box 11 which also contains the mechanism for operating the camera. The box 11 is provided with hinged or sliding doors (not shown) to permit access to the interior of the box.

The camera 10 is preferably a developing camera of the Polaroid Land type in which the film is developed and a print made within the camera immediately after the picture is taken. Advancing of the film web to take a succeeding picture ruptures a small pod of developing fluid to develop and print the picture, the printed picture being removed by opening a door in the back of the camera after allowing about one minute for developing and printing. A camera of this general type is shown in Land U. S. Patent 2,435,717.

The lens and shutter assembly 12 of the camera 10 is mounted for longitudinal movement within the box 11, a gear rack 14 running lengthwise of the box 11 and being engaged by a gear 15 mounted on the lens and shutter assembly. Rotation of a knob 16 connected with the gear 15 rotates the gear to move the lens and shutter assembly 12 lengthwise of the box 11, a customary light-tight bellows 17 connecting the lens and shutter assembly with the rest of the camera. The lens and shutter assembly 12 has an indicator pointer 19 mounted thereon and moving along a scale 20 mounted on the box 11 and graduated so as to indicate proper position of the assembly for the size of enlargement, if any, desired. This assembly is provided with a more or less customary shutter operated by a trigger or lever 18.

A copyholder 21 for holding the object to be photographed is removably mounted on a carriage 22, this carriage being mounted for movement along the gear rack 14 and having a gear 24 engaged with the rack and rotated by a knob 25 to adjust the carriage to varying distances from the camera according to the enlargement desired. An indicator pointer 26 mounted on the carriage 22 moves along the scale 20 similarly to the indicator pointer 19, correct positions of the carriage for various enlargements being indicated on the scale.

The copyholder 21 is illuminated by a pair of incandescent lamps 27, 27 mounted on the carriage 22 between the copyholder and the camera 10, one on each side of the copyholder so as not to interfere with the photographing of copy received within the copyholder. Reflectors are mounted behind each of the lamps 27, one reflector 29 being shown.

In a self-developing and printing camera, such as the Polaroid Land camera, it is very important that the film and printing paper be progressed at a uniform rate between pictures in order to evenly spread the developing fluid after the pod has been ruptured by advancing the film and paper, so as to obtain a perfectly developed and printed picture. In the apparatus of the present invention, the film is advanced absolutely uniformly by an electrically operated film-advancing mechanism 30, which operates at constant speed and engages the leader strip or film 31 so as to advance the film for the next succeeding picture and initiate development and printing of the picture just taken. This mechanism will be described in detail later in this application.

Figure 2:
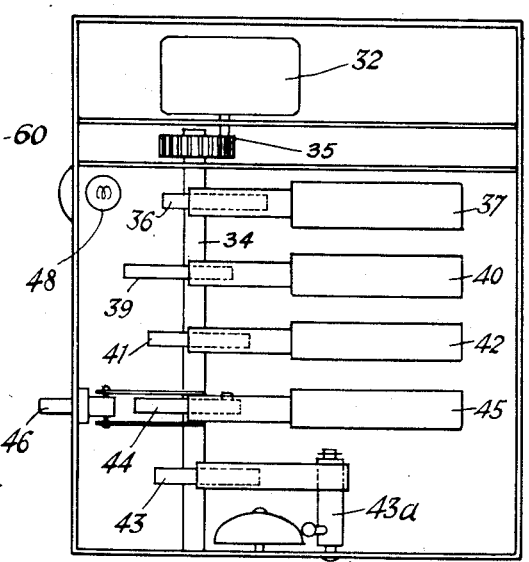
Fig. 2 is a somewhat diagrammatic cross section of the control mechanism for electrically actuating the several parts of the machine, taken generally on the line 2—2 of Fig. 1.
Figures 7, 8:
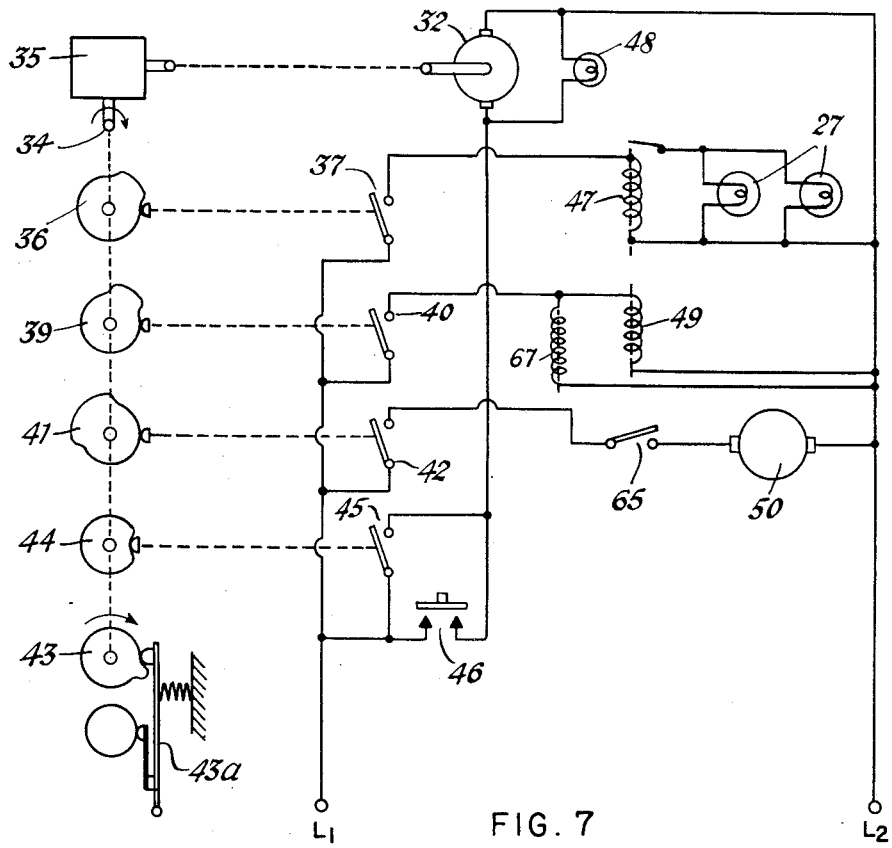
Fig. 7 is a wiring diagram for the machine of the present invention.
Fig. 8 is a table indicating sequence and time of operation of the various component parts of the machine.

Operation of the lamps 27, 27, shutter, trigger 18, and the film-advancing mechanism 30 for the proper time and in the proper sequence is obtained by an electrical control system indicated in Fig. 2 and diagrammatically indicated in Fig. 7. This system, which is contained in a compartment 33 at one end of the box 11, comprises a synchronous electric motor 32 which drives a cam shaft 34 through a reduction gearing 35, the cam shaft 34 making a single rotation during the period of one-and-one-half minutes, which is the operating cycle or time required for taking, developing, and printing a picture.

The cam shaft 34 has a series of four cams (numbered 36, 39, 41, and 44) mounted thereon, each cam actuating a separate electrical switch for controlling an electrical circuit, the switches being biased open and the cams being shaped to operate the switches and energize the corresponding circuits at the proper time and for the correct interval during the operating cycle of the apparatus. An indicator light 48 mounted in the wall of the compartment 33 and connected in parallel with the motor 32 is illuminated continually during the operating cycle of the apparatus.

A fifth cam 43 mounted on the cam shaft 34 mechanically operates a clapper 43a to ring a small bell 53 within the compartment 33 to give an audible signal when the operating cycle of the apparatus has been completed.

Cam 36 actuates an electrical switch 37 for controlling the circuit to the lamps 27, 27. Cam 39 actuates an electrical switch 40 for controlling an electrical circuit to operate the camera shutter. Cam 41 actuates an electrical switch 42 for controlling a circuit to the film-advancing mechanism 30. The fourth cam 44 actuates an electrical switch 45 (the main switch) for controlling the circuit to the synchronous motor 32 so as to cause the motor and cam shaft to complete a single cycle and then stop. A hand-operated switch 46 of the push-button type connected in parallel with the switch 45 serves to initiate operation of the apparatus, depression of this switch for a short time causing operation of the motor 32 and rotation of the cam 44 to close the switch 45. These switches are wired into a circuit as indicated in Fig. 7.

The switch 37 for controlling operation of the lamps 27, 27 may be connected as indicated in Fig. 7 to operate an electrical relay 47 in circuit with the lamps and illuminate the copyholder. The switch 40 is connected to operate a solenoid 49 mounted on the lens and shutter assembly 12 and linked to operate the camera shutter trigger or lever 18.

The switch 42 is connected to control operation of the film-advancing mechanism 30. The film-advancing mechanism comprises an electric motor 50 which, operating through a reduction gear drive, rotates a driving roller 51 located immediately above the camera 10, both the motor and roller being mounted in a frame 57. The driving roller 51 is approximately the width of the camera and may have a toothed or serrated surface to increase surface friction and to drive a cooperating driven roller 52. The roller 52 preferably has its axis mounted for movement away from the roller 51, this roller being resiliently urged against the film web 31 and the roller 51 by a spring 54 located at each end of the rollers. The roller 52 may be retracted from the roller 51 against the bias of the springs 54, 54 by an eccentrically mounted rotary cam 55 and lever 56 for rotating the cam in order to insert the film between the rollers, the cam bearing against the frame 57 of the film-advancing mechanism.

As indicated in Fig. 8, the motor 50 of the film-advancing mechanism 30 is actuated by the cam 41 for a fixed period of time which, in the arrangement shown, has been chosen as sixteen seconds. This is more than sufficient time to advance the film web for the next succeeding picture and initiate developing and printing of the preceding picture, and allows for a certain amount of slippage which may occur between the rollers 51 and 52 and the film 31.

The Polaroid Land type camera, as now constituted, incorporates a mechanism generally as shown in U. S. Patent to Fairbank 2,543,159 for stopping the film after it has been advanced the proper amount between pictures, this arrangement comprising a pair of resiliently supported detent pins which enter into a pair of holes preferably formed in the printing paper to arrest progress of the paper and film, the holes being located to stop the paper and film after they have been progressed the proper amount. These detent pins move a short distance with the paper before arresting movement of the paper and film.

Figure 4:
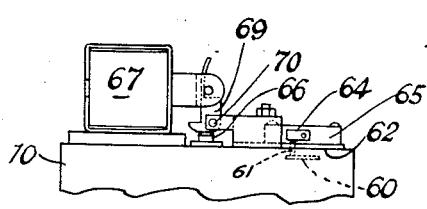
Fig. 4 is a somewhat diagrammatic fragmentary end elevation of controls for the film-progressing mechanism.

In the structure of the present invention, a small lever 60 inside the camera (Fig. 4) is positioned in the path of movement of one of the detent pins (not shown), the lever being mounted on a shaft 61 journalled in the back well 62 of the camera. The outer end of the shaft 61 has a lever 64 fixed thereto so as to be rotated by the detent pin and the lever 60. A normally closed microswitch 65 mounted on the back wall 62 of the camera in the path of the lever 64 is biased to open position by movement of the lever, this switch being in series with the motor 50 of the film-advancing mechanism 30 so as to interrupt the circuit to the motor and disable operation of the film-advancing mechanism after the film web has been advanced the proper amount, even though the cam-operated switch 42 is still closed.

Figure 3:
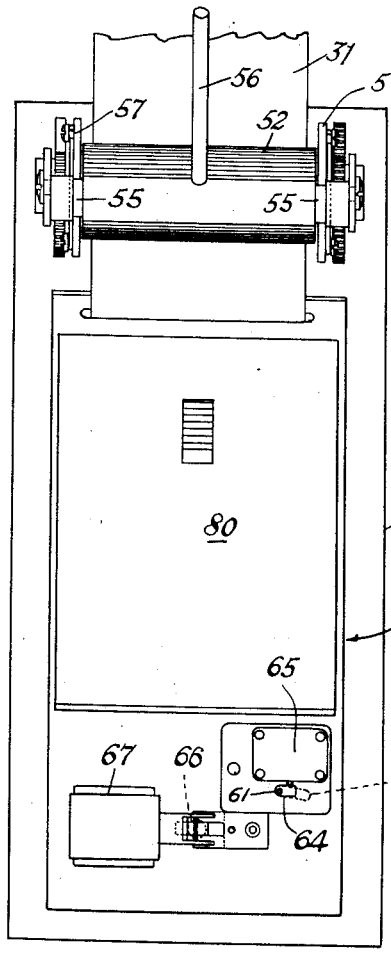
Fig. 3 is a somewhat diagrammatic end elevation of the back of the camera and certain of the associated parts, showing the film-progressing mechanism and controls therefor.

The detent pins of the Polaroid Land camera must be withdrawn from the printing paper web before the paper and film can be progressed to take the next succeeding picture. This is accomplished by pressing a button on the back of the camera to cause withdrawal of the pins (see Fairbank U. S. Patent 2,543,159). In the apparatus of the present invention, the detent withdrawing button 66 (Figs. 3 and 4) is operated by a solenoid 67 mounted on the back wall 62 of the camera and linked to a solenoid-operated cam 69 pivotally mounted on a shaft 70 secured on the back of the camera. Oscillation of the cam counterclockwise (as viewed in Fig. 4) by the solenoid 67 serves to depress the button 66 so as to withdraw the detent pins from the paper web (see Fairbank U. S. Patent 2,543,159). The solenoid 67 may be operated from either switch 37 or switch 40, and preferably is operated from switch 40 connected with the circuit for operating the camera shutter, as indicated in Fig. 7.

Figure 5:
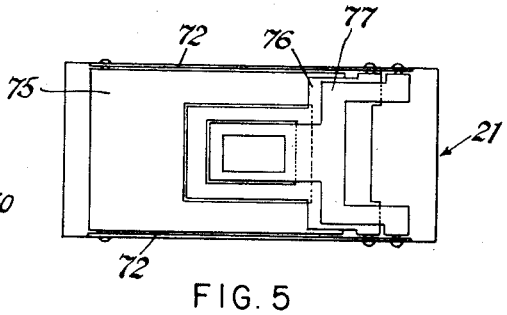
Fig. 5 is a plan view of the copyholder, the masks and glass plate being folded down in position over copy.
Figure 6:
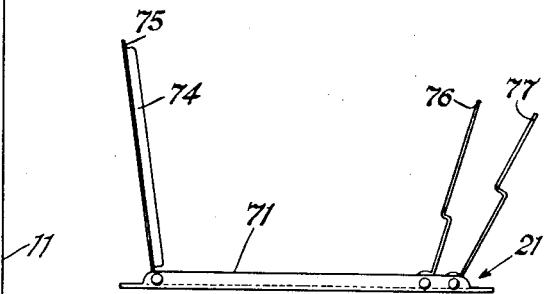
Fig. 6 is a side elevation of the copyholder, the glass plate and masks being shown in raised position.

The copyholder 21, which is slidably received on the carriage 22, may be formed as indicated in Figs. 5 and 6. The copyholder preferably comprises a rectangular metal plate 71 having upturned side edges 72, 72. A glass 74 may be mounted in a frame 75 pivotally mounted on the side edges 72, 72 of the copyholder, so that the glass 74 may be rotated against plate 71 to secure the copy in position thereon. Metal frames 76 and 77, having successively smaller apertures as indicated in Fig. 5, may be pivotally mounted on the opposite ends of the side edges 72, 72 so that one or both of these frames may be folded down over the glass 74 to supply a smaller frame for the object to be photographed. If one or both of the frames 76 and 77 are not desired, the frame or frames may be left open as indicated in Fig. 6 and the copyholder inserted within the camera apparatus.

In operation of the camera apparatus, the material to be photographed is first placed within the copyholder 21 and the retaining glass 75 and metal frames 76 and 77, if desired, folded over the copy to retain it in position and properly frame it. The copyholder 21 is then inserted on the carriage 22, a pair of raised lugs or ears 79, 79 being provided on the carriage to receive the copyholder. The lens and shutter assembly 25 and the carriage 22 are then properly adjusted for the degree of enlargement, if any, desired, after which the box 11 is closed. Then, by pressing the switch 46 for a short interval, operation of the apparatus is initiated, the indicator light 48 being illuminated during operation of the apparatus. The apparatus will then operate for a minute-and-a-half and proceed successively to illuminate the object, take the picture, advance, develop, and print the film, the bell 53 sounding and the light 48 being extinguished to indicate that printing of the picture is completed. The door 80 on the back of the camera 10 may then be opened and the printed picture withdrawn, after which the apparatus is ready to take another picture.

In some instances in which gradation of tone from light to dark in the developed picture is not desired, as when using the apparatus of the present invention for composing headlines for photolithography or reproducing print, high contrast film or paper may be used in order to obtain only black and white pictures with no gradations of grey.

I claim:

1. In automatically operated camera apparatus in which a film web is exposed and then advanced with a juxtaposed paper web to cause development of the film and printing on the paper web within the camera upon advance of the film to take a succeeding picture, electrically driven means for advancing the film between exposures, a switch in circuit with said electrically driven means and closed for a fixed interval of time to energize said means, said interval of time being longer than that required to advance the film between exposures, a movably mounted pin adapted to be received within a perforation in one of the webs so as to be carried with the webs for a short distance, and an electrical switch actuated by the movement of said pin in the direction of travel of said webs for interrupting an electrical circuit to the film-advancing means.

2. An automatically operated camera apparatus having a shutter and in which a film web is exposed and then advanced with a juxtaposed paper web to cause development of the film and printing on the paper web within the camera upon advance of the film to take a succeeding picture, an object holder, means for illuminating for a short period of time an object received within the holder, electrically actuated means for operating the shutter, electrically driven means for advancing the film between exposures, a movably mounted pin adapted to be received within a perforation in one of the webs so as to be carried with the webs for a short distance, electrically operated means for withdrawing said pin from the perforation, electrical control means for controlling electrical circuits operating the illuminating means, the shutter-operating means, the pin-withdrawing means, and the film-advancing means, and an electrical switch actuated by the movement of said pin in the direction of travel of said webs for interrupting the electrical circuit to the film-advancing means.

3. An automatically operated camera apparatus having a shutter and in which a film web is exposed and then advanced with a juxtaposed paper web to cause development of the film and printing on the paper web within the camera upon advance of the film to take a succeeding picture, an object holder, means for illuminating for a short period of time an object received within the holder, electrically actuated means for operating the shutter, electrically driven means for advancing the film between exposures, a movably mounted pin adapted to be received within a perforation in one of the webs so as to be carried with the webs for a short distance, electrically operated means for withdrawing said pin from the perforation, electrical control means operating in a fixed cycle for controlling electrical circuits operating the illuminating means, the shutter-operating means, the pin-withdrawing means, and the film-advancing means, and an electrical switch actuated by the movement of said pin in the direction of travel of said webs for interrupting an electrical circuit to the film-advancing means.

GEORGE E. CANHAM.

References Cited in the file of this patent

UNITED STATES PATENTS

| Number | Name | Date |
| --- | --- | --- |
| 791,062 | Wetmore | May 30, 1905 |
| 1,484,568 | Savage | Feb. 19, 1924 |
| 1,535,930 | McDonald | Apr. 28, 1925 |
| 1,580,115 | Brewster | Apr. 13, 1926 |
| 1,671,588 | Josepho | May 29, 1928 |
| 1,682,813 | Thompson | Sept. 4, 1928 |
| 1,816,290 | Klimis | July 28, 1931 |
| 1,992,017 | Spielvogel | Feb. 19, 1935 |
| 2,428,681 | Pratt | Oct. 7, 1947 |
| 2,553,014 | Singer | May 15, 1951 |
| 2,554,890 | Wolff | May 29, 1951 |